United States Patent [19]
Connell et al.

[11] Patent Number: 5,649,070
[45] Date of Patent: Jul. 15, 1997

[54] LEARNING SYSTEM WITH PROTOTYPE REPLACEMENT

[75] Inventors: Jonathan Hudson Connell, Cortlandt-Manor, N.Y.; Rakesh Mohan, Stamford, Conn.; Rudolf Maarten Bolle, Bedford Hills, N.Y.

[73] Assignee: International Business Machines Corporation, Armonk, N.Y.

[21] Appl. No.: 394,525

[22] Filed: Feb. 17, 1995

[51] Int. Cl.⁶ .................................................. G06F 17/00
[52] U.S. Cl. ............................. 395/77; 395/68; 395/54
[58] Field of Search ................... 395/54, 68, 77, 395/20, 10; 382/110, 155, 159, 160, 209, 224, 225

[56] References Cited

U.S. PATENT DOCUMENTS

| | | | |
|---|---|---|---|
| 5,060,290 | 10/1991 | Kelly et al. | 382/18 |
| 5,091,963 | 2/1992 | Litt et al. | 381/8 |
| 5,214,717 | 5/1993 | Kimura et al. | 382/21 |
| 5,335,293 | 8/1994 | Vannelli et al. | 382/17 |
| 5,519,789 | 5/1996 | Etoh | 382/255 |
| 5,524,065 | 6/1996 | Yagasaki | 382/226 |
| 5,537,488 | 7/1996 | Menon et al. | 382/170 |
| 5,546,475 | 8/1996 | Bolle et al. | 382/190 |
| 5,555,320 | 9/1996 | Irie et al. | 382/225 |

OTHER PUBLICATIONS

Chinrungrueng, C. & Sequin, C.H., "Optimal Adaptive K-Means Algorithm with Dynamic Adjustment of Learning Rate", IEEE Transactions on Neural Networks, vol. 6, No. 1, pp. 157–169 Jan. 1995.

Chinrungrueng, C. & Sequein, C.H., "Optimal Adaptive K-Means Algorithm with Dynamic Adjustment of Learning Rate", IEEE International Conference on Neural Networks, vol. I, pp. 855–862 1991.

Darken, C. & Moody, J., "Fast Adaptive K-Means Clustering: Some Empirical Results", IEEE International Conference on Neural Networks, vol. II, pp. 233–238 1990.

Deitel, H.M., Operating Systems, Addison-Wesley:New York, pp. 251–273 1990.

"Produce Recognition System", Application No. 08/235/834, filed Apr. 29, 1994.

R.S. Michalski et al, "NSF/DARPA Workshop on Machine Learning and Vision: A Summary", Proceedings of the DARPA Image Understanding Workshop, P. 351, Apr. 1993.

R.S. Michalski, "Pattern Recognition as Rule-Guided Inductive Inference", IEEE Transactions on Pattern Analysis and Machine Intelligence, vol. PAMI-2, No. 4, Jul. 1980, pp. 349–361.

R.P. Lippmann, "An Introduction to Computing with Neural Nets", IEEE 22. Acoustics, Speech, and Signal Processing Magazine, Apr. 1987, pp. 4–22.

J. Ross Quinlan, "Learning Efficient Classification Procedures and Their Application to Chess End Games", Machine Learning: An Aritifical Intelligence Approach, Tioga Publishing, Palo Alto CA, 1983, pp. 463–482.

P.H. Winston, "Learning Class Description from Samples", Artificial Inteligence (2nd Ed.), Addison-Wesley, 1984, pp. 391–414.

R.O. Duda et al, "Nonparametric Techniques", (Chapter 4), Pattern Classification and Scene Analysis, 1973, pp. 85–129.

A.K. Jain et al, "Algorithms for Clustering Data", Prentice Hall, 1988, pp. 88–103.

*Primary Examiner*—Tariq R. Hafiz
*Attorney, Agent, or Firm*—Whitham, Curtis, Whitham & McGinn; Louis J. Percello

[57] ABSTRACT

One or more sets of prototype descriptions for a number of classes of objects stored on a computer database are maintained. These prototypes are used as a basis for identifying the class of a presented object. A trainer determines when a new prototype is required to be added to the database based on current match results. This allows the system to be trained to recognize items in classes that deviate significantly from the items that were initially used to determine the classification rules. A determination is made about which prototypes can be deleted on the basis of their match histories. This allows the system to automatically optimize itself to work with a bounded collection of prototypes. In addition, it allows the system to track variations in class characteristics over time and adjust the corresponding set of prototypes appropriately.

15 Claims, 6 Drawing Sheets

LEARNING SYSTEM WITH PROTOTYPE REPLACEMENT

FIELD OF THE INVENTION

This invention relates to the field of computer recognition of objects. More specifically, the invention relates to a system and method of learning about unknown objects in computer recognition.

BACKGROUND OF THE INVENTION

Learning systems exist in the prior art of computer recognition for matching an object against a database of prototypes. Some techniques used are: nearest neighbor, classification and regression trees, neural networks, and rule-based systems. These systems usually take a large corpus of correctly labelled training samples from which they produce generalized category descriptions. These generalized descriptions are then used to classify unknown objects. Often these methods attempt to produce a fast procedure for accomplishing this recognition. Typically these systems operate in an off-line "batch" mode: they use a fixed corpus to design a classifier which then remains unchanged thereafter.

In this field there are a number of common terms:

An "item" or "object" or "presented object" corresponds to the thing presented for recognition.

A "class", "category", or "label" is a designation for a group of similar objects.

"Identifying", "classifying", or "recognizing" means generating the correct group label for a presented object.

"Training" or "learning" is a function enabling a system to correctly recognize items that it previously mis-classified.

A system is usually trained by showing it "examples", "instances", or "prototypes". These are objects which are typical of a class. The preferred term in this disclosure is prototype.

"Features", "characteristics", or "qualities" are properties of an object which are potentially useful for the current classification task. The preferred term in this disclosure for a collection of such properties is "object description."

"Prototype descriptions" are the object descriptions that are used for the classification of unknown objects.

"Nearest-neighbor comparison" is a technique for classifying objects based on the distance of the object description to the prototype descriptions.

In "supervised" learning the system is given examples and their correct labels. In "unsupervised" learning the system attempts to build or refine a classifier without external guidance.

"Bulk items" include any object (item) that is sold in bulk in supermarkets, grocery stores, retail stores, or hardware stores. Examples include produce (fruits and vegetables), sugar, coffee beans, candy, nails, nuts, bolts, general hardware, parts, and packaged goods.

STATEMENT OF PROBLEMS WITH THE PRIOR ART

Most of the prior art is concerned with building a classifier based on a set of examples given to tile system when the system is designed. Once tile actual examples are used to construct a recognition procedure, tile examples are discarded and only the constructed recognition procedure is retained. This is usually sufficient if the example set is representative of the distribution of objects likely to be encountered in the future. However, in some cases, the qualities/features/characteristics indicative of some particular class will change over time. A system with a fixed recognition procedure cannot deal with such variations.

This situation occurs, for instance, with a system for recognizing different types of fruits and vegetables by their colors. Bananas start out green, turn to yellow, then finally to black. A recognition system trained on just the initial green bananas is likely to fail on the brown ones. The color characteristics of fruit also typically change with season and supplier. The apples shipped from the warehouse this week might be slightly redder than the apples shipped last week. Thus, for this application it is necessary to have a system which can be "incrementally" trained over time.

Many systems attempt to ameliorate this drift problem by merging in new training instances as needed. In some (such as rule based) this operation is relatively easy and does not introduce any errors in previously learned classes. In others (such as neural nets) adding a new example of one class can lead to a degradation in the system's performance on other classes. One way around this is to save every training example ever encountered, both old and new, and then build a new recognition procedure every time this set changes. Unfortunately, this usually leads to an excessively large database and computationally expensive retraining (which is often slow) every time a new recognition routine is generated.

Moreover, to track variations in class features it is also necessary to discard ("forget") some of the old prototypes. If the current bananas are brown then to achieve satisfactory recognition there is no need to remember the examples where they were yellow. In fact, if a new batch of yellowish oranges are received, the system should not attempt to match these to the old yellow examples of bananas. Forgetting is difficult for most conventional systems and just about impossible for some (like neural nets). The usual method is as described above, all the original data plus the new training data is saved and then used to create a brand new classification murine.

OBJECTS OF THE INVENTION

An object of this invention is an improved trainable apparatus and method for recognizing objects (items) based on prototype descriptions.

Another object of this invention is an improved apparatus and method for recognizing classes of objects even when their characteristics change over time.

Another object of this invention is an improved apparatus and method for recognizing classes of objects that removes less relevant prototype descriptions from a database when the characteristics of the classes of objects to be recognized change over time.

SUMMARY OF THE INVENTION

The present invention is a system and apparatus that automatically learns to classify input objects based on prototype descriptions where the characteristics of the input objects may change over time. The learning is due to maintaining or updating a database of prototype descriptions by deleting prototype descriptions from and adding prototype descriptions to an old set of prototype descriptions to create a new set of prototype descriptions. The new set more accurately describes an object class (e.g., apple) of the input object, or object, presented to the system for recognition. Examples of prototype descriptions include visual characteristics of the object, like color, texture, size, and shape. In some preferred embodiments the objects are bulk items and/or produce.

The system includes an input device for representing the presented object in a machine readable form. A feature extractor then takes the machine readable form of the object and generates one or more object descriptions, e.g., color of the object. Each of the object descriptions has a description form, e.g., a histogram of color frequencies. Sets of prototype descriptions are stored in a system memory. Each set is associated with an object class to which the object might belong. The prototype descriptions in the sets each have the same description form as the object description. If the system matches the object description against one of the prototype descriptions in the set, the object is identified as belonging to the class with which the set is associated.

A trainer incrementally changes one or more of the stored prototype descriptions when the system reaches a bound or limit. This limit can be any arbitrary limit, including a memory storage limit for storing the prototype descriptions, a limit on the number of prototype descriptions that are permitted in a set representing an object class, a time limit, and/or an event limit (a new shipment of produce is one sale). After the trainer updates a prototype description set by adding and/or deleting one or more prototype descriptions, the updated set more accurately describes the class with which it is associated. Selections of prototype descriptions to delete and/or add are novelly based on the statistics of the match histories and the frequency of use for each prototype description.

The system also can optionally include a user interface that displays the classification of the object; that allows for human-initiated training; and, that allows for human feedback on the classification results.

DETAILED DESCRIPTION OF THE INVENTION

Figure 1:
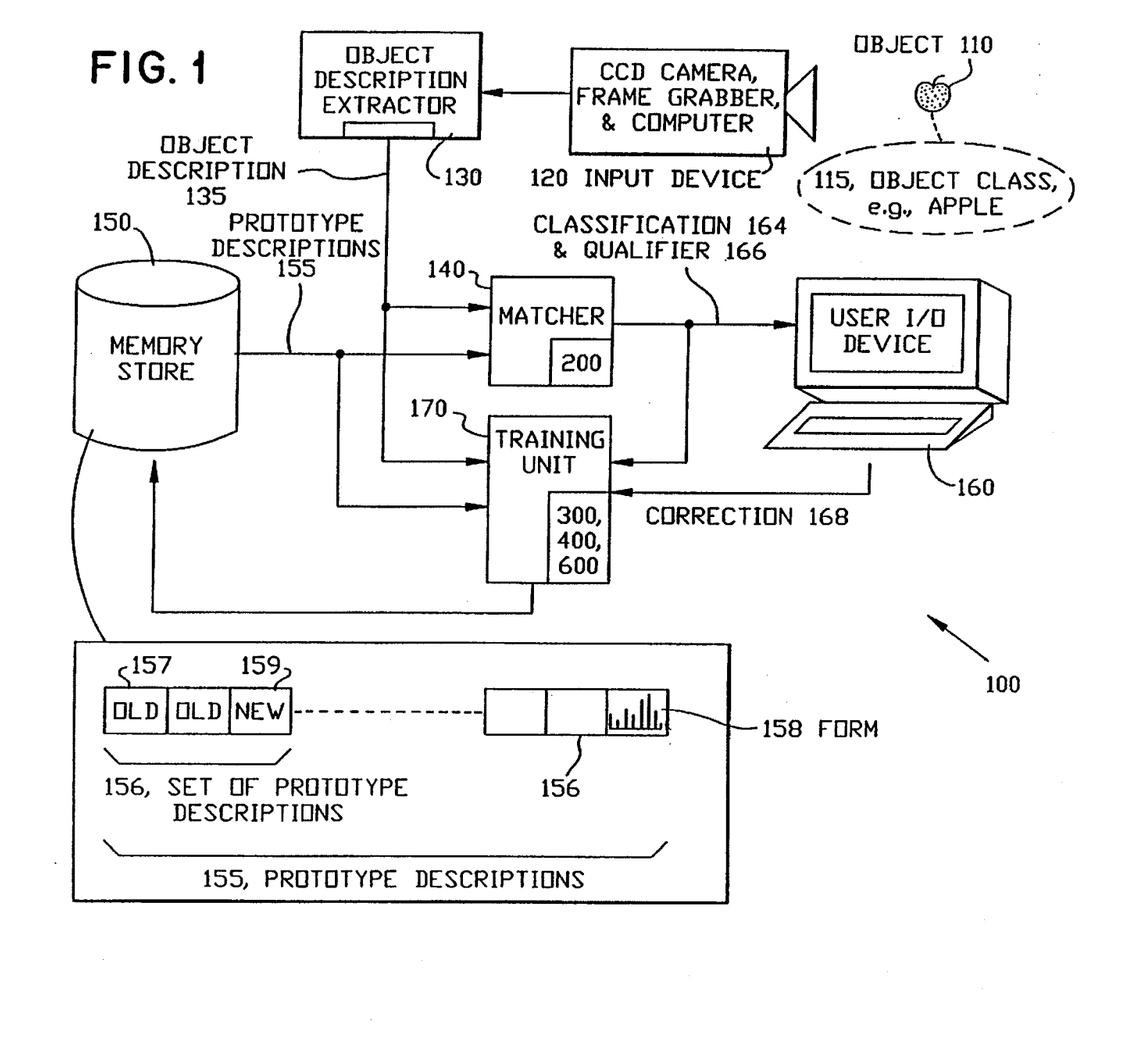
FIG. 1 is a block diagram of a preferred embodiment of the present system.

The apparatus 100 shown in FIG. 1 is one preferred embodiment of the present invention. Relevant aspects (as determined by the overall task) of object 110 are converted to a machine readable form with input device 120. The feature extraction device 130 analyzes this representation to generate an object description 135 (see also block 210 in FIG. 2). The matching device 140 then compares this object description 135 with prototype descriptions 155 for different classes obtained from storage device 150. The most likely object class (classification, 164) associated with a qualifier 166 is output to the (optional) user interface I/O device 160 for consideration by a human operator. If desired, the operator can then correct (correction, 168) the machine's decision by entering the appropriate class for object 110 on I/O device 160. (This is further described in FIG. 3.) The class selected by the machine 164 and the optional correct class 168 supplied by the operator then pass to training unit (trainer) 170. This unit decides whether more training is needed and, if so, adds (or substitutes) a new prototype description onto storage device 150. Training unit 170 also updates the usefulness scores (see FIGS. 6 and 7) for the relevant prototype descriptions stored on device 150 so that an intelligent choice (i.e., one which does not significantly degrade performance) can be made if prototype descriptions need to be deleted.

Input device 120 could be a TV camera, laser scanner, network of thermal monitors, acoustic sensor, keyboard, or any other known data acquisition device. One preferred embodiment of input device 120 includes a color CCD camera such as a Sony XC-999 or Sony card camera CCB-C35YC. For this type of video source data, input device 120 might additionally consist of a computer frame grabber board on a computer. A preferred embodiment is a Data Translation DT2871 framegrabber connected to a Data Translation DT2878 DSP board. Whatever input source 120 is chosen, object description extractor 130 must be configured properly to deliver an abstraction that encodes relevant differences (with respect to the recognition task) between classes of objects while minimizing the difference in representation between members of the same class. Description extractor 130 could be running an algorithm that generates area-normalized hue, saturation, and intensity histograms. These histograms then are the object description 135 derived for object 110. Other input modalities would require different input devices and different feature extractors. For instance, in undersea applications the input device 120 might be an array of sonar transducers while the feature extractor 130 might be special purpose analog hardware (surface acoustic wave filters, correlators, etc.) coupled to a dedicated multi-node digital signal processor.

An object description 135 is any quantity that can be derived from the machine readable form outputted by device 120 that encodes relevant differences (with respect to the recognition task) between classes 115 of objects 110 while minimizing the difference in object description between members of the same class 115. For example, based on visual machine readable form, such a description can simply be the histogram of gray levels in this form—i.e., an enumeration of the number of times each possible gray level appears in the machine readable form. Other equivalent examples of object descriptions 135 are within the contemplation of the inventors and would be apparent to one skilled in the art given this disclosure and U.S. patent applications: Ser. No. 08/235,834 entitled Produce Recognition System filed on Apr. 29, 1994 to Bolle et al.; Ser. No. 08/235,064 entitled Object Imaging System filed on Apr. 29, 1994 to Bolle et al.; and Ser. No. xxx entitled Produce Size Recognition filed on the same day as this application to Mohan et al. which are all herein incorporated by reference in their entirety.

The prototype descriptions 155 are structured in a database. This database can be structured in any known method for organizing descriptions of objects in a database. An example is a linear structure 155, where all prototype descriptions are linearly ordered in memory 150 and where prototype descriptions (157, 159) representing one class of objects are grouped together in consecutive sets 156. A set 156 is associated with prototype descriptions 157, 159 that belong to a single object class 115 and are derived from machine readable form given by input device 120. Such a set 156 describes an object class 115, in that each description in such a set 156 (such as 157 or 159) is derived from a machine readable description form of a prototype object in this class and each prototype description is associated with a unique class label associated with the class 115. Set 156 can have old prototype descriptions 157, and new prototype descriptions 159. A novel aspect of this invention is that old prototype descriptions 157 can be incrementally replaced by new prototype descriptions 159. Such replacement is novelly determined by a usefulness score (as defined in the description of FIGS. 6 and 7) associated with each prototype description in the database 155 for each class 156.

Description forms 158 are machine readable forms of each prototype description (e.g., 157, 159) in the set 156. Examples of description forms 158 include histograms, etc. as described above. Other known description forms 158 are possible. The prototype description forms and the object descriptions 135 have the same description form 158.

Figure 2:
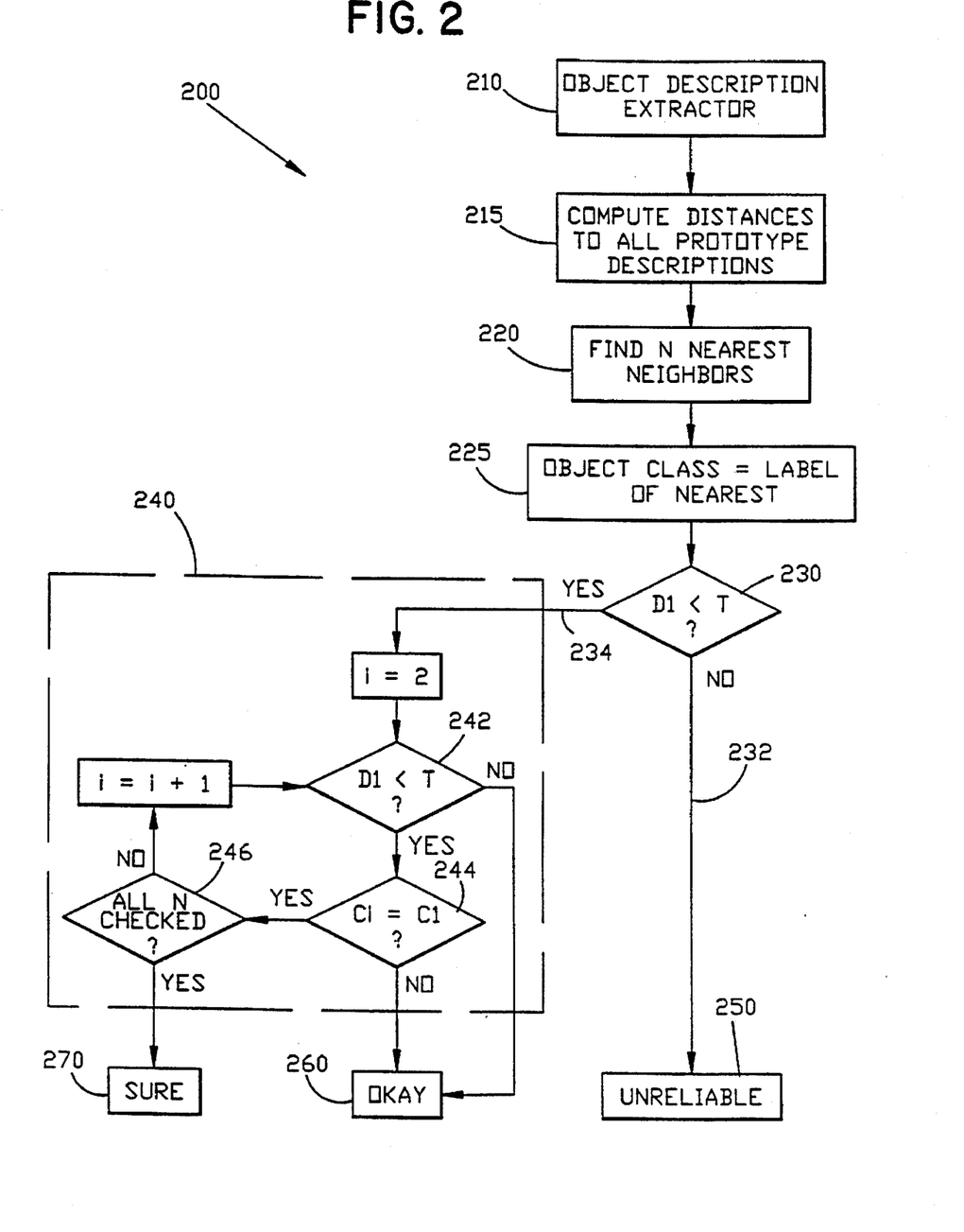
FIG. 2 is a flow chart showing a preferred embodiment of the present method for recognizing objects and assigning a confidence measure, e.g., match strength, to the resulting answer.

One preferred embodiment of matching device 140 is a computer running the novel incrementally adapted nearest-neighbor comparison algorithm 200 (described in FIG. 2). Another preferred embodiment is a special-purpose DSP (digital signal processor) board running this novel incrementally adapted nearest-neighbor comparison algorithm. Other computing means such as analog electronic devices, optical correlators, neural net hardware, custom ASICs (application specific integrated circuits) such as the IBM ZISC, or any other means known in the art may be used. Similarly, the actual method implemented by matching device 140 may be a rule-based expert system, neural net classifier, case-based analogy system, classification tree, fuzzy logic reasoner, or any other method known in the art. The prototype descriptions retrieved from memory store 150 might be used directly in the matching process or indirectly as a basis for generating an equivalent recognition procedure. The production of a classification tree is an example of the indirect approach because the prototype set cannot be reproduced given just the final tree. Memory store 150 itself might be an optical disk, magnetic tape, semiconductor memory, or any other storage device known in the art. It may exist separately or physically intermingled with matching device 140.

User input-output device 160 is optional. It may be used to display the result (164 and 166) of marcher 140. The end result of classifying an input object, classification 164, (e.g., a produce item) might be that the word "banana" appears on I/O device 160. This same information might be provided by other means in auditory form to some end-user. Alternatively, this classification result 164 could be directed to some other output device like a mechanical sorter, or provide an input for another computer such as a price lookup system, or be filed for later reference using a device such as a hard drive or a printer. Another use for I/O device 160 is to provide training unit 170 during learning with either the true class label (correction 168) for object 110, or simply an indication whether the class selected by matcher 140 is correct or not (correction 168). Typically, this information is provided by a human user through a keyboard, touch display, mousesensitive screen button, or speech. Alternatively, this same information might be provided by a different system such as a crate-packing device that signals an error when asked to put a grapefruit in a box designed for apples.

Finally, a preferred embodiment of training unit (trainer) 170 is a computer running algorithms 300, 400, and 600 (described later). This may or may not be the same computer as may have been used to determine matching device 140. Similarly, memory store 150 may be implemented differently (and possibly separately) for training unit 170 and matching unit 140. For instance, matching unit 140 might be distributed hardware in which the database of prototype descriptions 155 is stored in local RAM (Random Access Memory)cache. Training unit (trainer) 170 might then be an algorithm running on a computer which accesses the same prototype data but from its hard disk. All that is important is that the data in the corresponding realizations of storage device 150 be kept consistent. That is, each database must represent in some form (not necessarily form 158) the same sets of prototypes 156, where each member of each set (e.g. prototype descriptions 157, 159) encodes the same basic feature information with the same resolution. If training unit 170 alters the prototype descriptions ostensibly stored on device 150, these changes must also correspondingly alter the prototype descriptions used by marcher 140.

FIG. 2 shows a flowchart of novel algorithm 200 which is implemented by matching device 140 in a preferred embodiment. Algorithm 200 reports the most likely class, classification 164, for object 110 along with a qualifier 166 saying how confident the system is in this match. In one preferred embodiment, the output qualifiers are "sure" (270), "okay" (260), and "unreliable" (250). Algorithm 200 takes as input an object description 210 compelled for input object 110 by object description extractor 130 (i.e. object description 135). Step 215 compares this object description with the prototype descriptions retrieved from memory store 150 to generate a distance score for each prototype in database 155. That is, it determines the distance of object description 210 to all the prototype descriptions in memory 150. Once the distances are determined, step 220 determines the N closest (least distant) prototype descriptions (representing prototype objects). A preferred value for N is 2 although it could be any integer greater than 0. In step 225 the object class associated with the closest prototype description is declared to be the classification 164 reported by matcher 140.

The remainder of algorithm 200 determines a qualifier 166 for this match. First, step 230 determines whether the closest prototype description's distance (D1) is beyond some threshold T. A preferred value for T is 25% of the maximum possible difference between prototype descriptions. If step 230 judges that the example is too dissimilar (D1>T) to the closest prototype description (top match), branch 232 is taken and a qualifier of "unreliable" is output to I/O device 160 (and training unit 170) in step 250. If, instead, the top match is acceptable, branch 234 is taken to loop 240.

Loop 240 examines the next N-1 matches (closest prototype descriptions) and determines whether they are also associated with the same object class as the very top match (classification 164). It first checks in step 242 whether the i'th best matching prototype description's distance (Di) is reasonably close to object description 210. (Reasonably close means that the distance, Di, is less than the threshold distance, T.) If not, step 260 outputs the qualifier "okay" since the first match was reasonably close but loop 240 was not able to find N-1 other reasonably close matches to compare it to. If the i'th best prototype description does pass the test in step 242, step 244 next determines whether the object class associated with this prototype (class Ci) is the same as the object class associated with the best prototype description (C1, which is classification 164).

If not, step 260 declares the match to be simply "okay" (for I/O device 160 and training unit 170) since it was not corroborated by the N-I next matches. Steps 242 and 244 can be performed in the opposite order if desired. Finally, if the i'th prototype passes both tests (step 242 and step 244) step 246 determines whether all the top N matches have been tested. If so, then they have all been found to be reasonable matches that agree with the object class of the best match. Therefore step 270 declares the object class answer to be "sure" for use by I/O device 160 and training unit 170. Otherwise, if there are more classes to be tested, loop 240 is repeated for prototype i+1.

Algorithm 200 is just one preferred method for novel matching device 140. All that is required of marcher 140 is that N closest object descriptions qualified by some confidence measure be generated as output. For instance, instead of having loop 240 test that the next N-1 matches have the same object class as the top match, it could be weakened to just to test whether the majority have the same class. Alternatively, matcher 140 might be implemented in a different way such that it was directly able to assign a qualifier 166 to the best match. For example, using a neural network and a different definition of distance, a sufficiently small entropy value computed over the output units might correspond to the "sure" qualifier.

It is also not necessary for matcher 140 to output just the N best prototype descriptions. In some cases it may be desirable to generate a ranked list of the top P different object classes (not top P different prototype descriptions). One preferred value for P is 4. Here, if the match qualifier is merely "okay" and not "sure", then user I/O device 160 might might display all P object classes in order and ask the user to select one of these choices (or override the system completely and specify a different class). User correction 168 is denoted in FIG. 1.

One skilled in the art given this disclosure can devise equivalent schemes that accomplish the same or similar results as algorithm 200. These schemes are also within the contemplation of the inventors.

Figure 3:
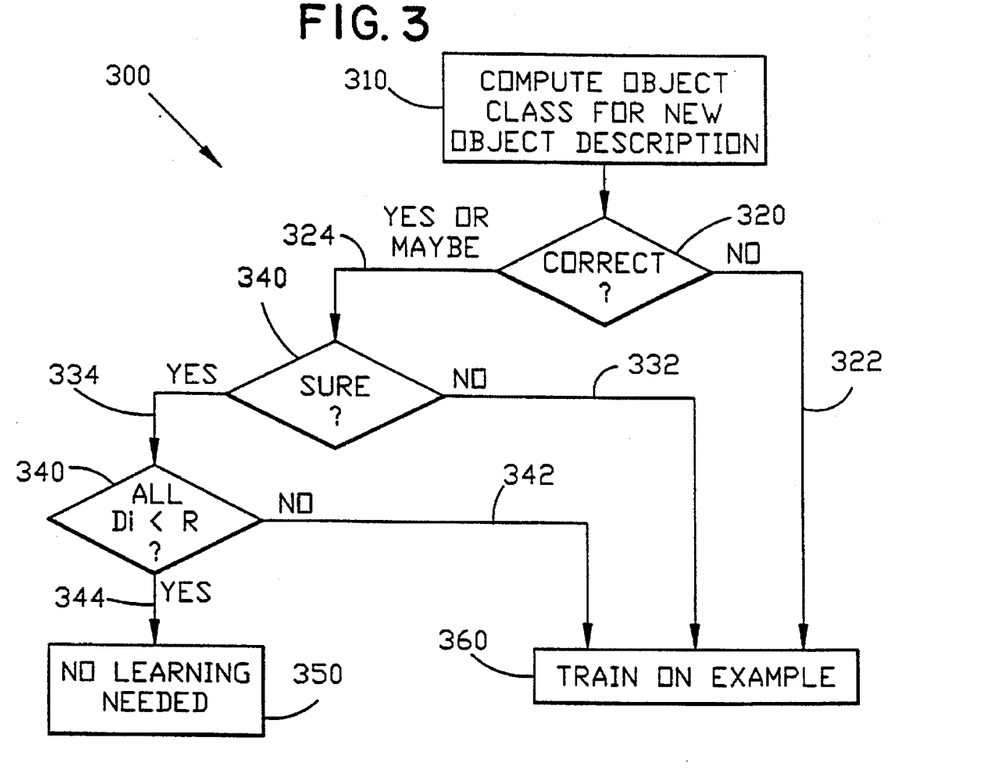
FIG. 3 is a flow chart showing a preferred embodiment of the present method for determining when to learn, i.e., when new prototype descriptions need to be added.

FIG. 3 shows the flowchart for algorithm 300 which determines when the system should construct a new prototype description. Algorithm 300 forms part of a preferred embodiment of training unit 170. The primary input datum 310 to algorithm 300 is the object class 164 picked by marcher 140. Step 320 checks whether this classification is correct, possibly based on a correction signal 168 provided by user I/O device 160. If matcher 140 generated an answer known to be wrong (as communicated 168 through I/O device 160) then branch 322 is taken and step 360 requests training on this example. However, in this case training can only be done if the proper object class 168 is also provided for the example (i.e., full supervised learning). If, instead, the computed object class is correct (or assumed to be correct in the absence of feedback), branch 324 is taken and step 330 checks whether the qualifier was "sure" (from step 270). If the matcher was not sure of its answer, branch 332 is taken and further training is requested on this object description (step 360).

Finally, if the matcher generates the correct answer and is sure of its choice (branch 334), step 340 checks whether the current object description lies on the fringe of a classification region or near the center. A classification region is a portion of prototype description space which is populated with prototype descriptions that are associated with the same object class. In one preferred embodiment step 340 checks the distances of the top M prototypes descriptions (including the closest one) as provided by marcher 140. In general, M is less than or equal to N (the number of high ranked prototypes descriptions examined to compute the match qualifier). A preferred value for M is 1. Let Di be the distance from current object description to the i'the prototype description. If any Di is greater than some threshold distance R, step 340 judges that the classification region is not compact enough 342 and further training is requested (step 360). Here "not compact enough" means that the classification region is not densely populated with prototype descriptions of the same object class. However, if the current object description is less than distance R from all of the top M prototype descriptions, the class is judged sufficiently compact 344 and no additional training is needed (step 350). The value chosen for R reflects the expected spacing between object classes in prototype description space. A preferred value for R is 10% of the maximum distance possible between two prototype descriptions.

Steps 320, 330, and 340 can be done in any order.

Given this disclosure, one skilled in the art can devise different equivalent schemes to accomplish incremental learning that arrive at similar results to those obtained with algorithm 300.

Figure 4:
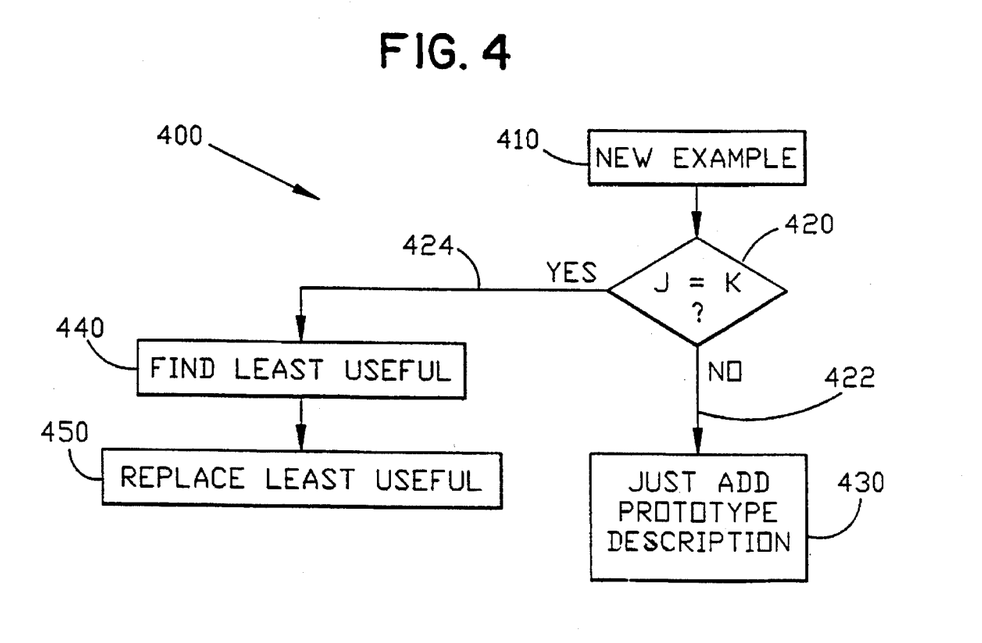
FIG. 4 is a flow chart showing a preferred embodiment of the present method for determining which old prototype description to replace.

The description above discloses how to match object descriptions to prototype descriptions and when to learn a new prototype description. FIG. 4 shows a flowchart for algorithm 400 which details how the actual learning is performed. Algorithm 400 is part of a preferred embodiment of training unit 170. In most cases branch 422 is taken and the current object description (135) to be inserted as a new prototype description (input at step 410) is simply copied (step 430) onto storage device 150 and labeled with the correct object class. Yet if this is done freely, it is easy to build up prohibitively large collections of prototype descriptions. For this reason it is useful to set some limit, K, on the maximum number of prototype descriptions for each object class. Step 420 tests for this condition. Here, J is the current number of prototype descriptions stored for the current object class. If the limit K has not been reached 422, a new prototype description is added 430 to prototype database 155. If the limit has been reached 424, training unit 170 must first erase some old prototype description before adding a new one. It does this by finding the "least useful" (see FIGS. 6 and 7) old prototype in step 440 and then substituting the current object description in its place (step 450). This puts a bound on the maximum number of prototype descriptions stored by the system and hence specifies the maximum capacity required for storage device 150. This maximum capacity is defined as K×the number of object classes.

An alternative to replacing the least useful prototype description in the object class associated with object description is to replace the least useful prototype description in the overall database. Of course, care has to be taken so that no set of prototype descriptions 156 is completely depleted while the corresponding object class 115 still needs to be recognized.

Figure 5:
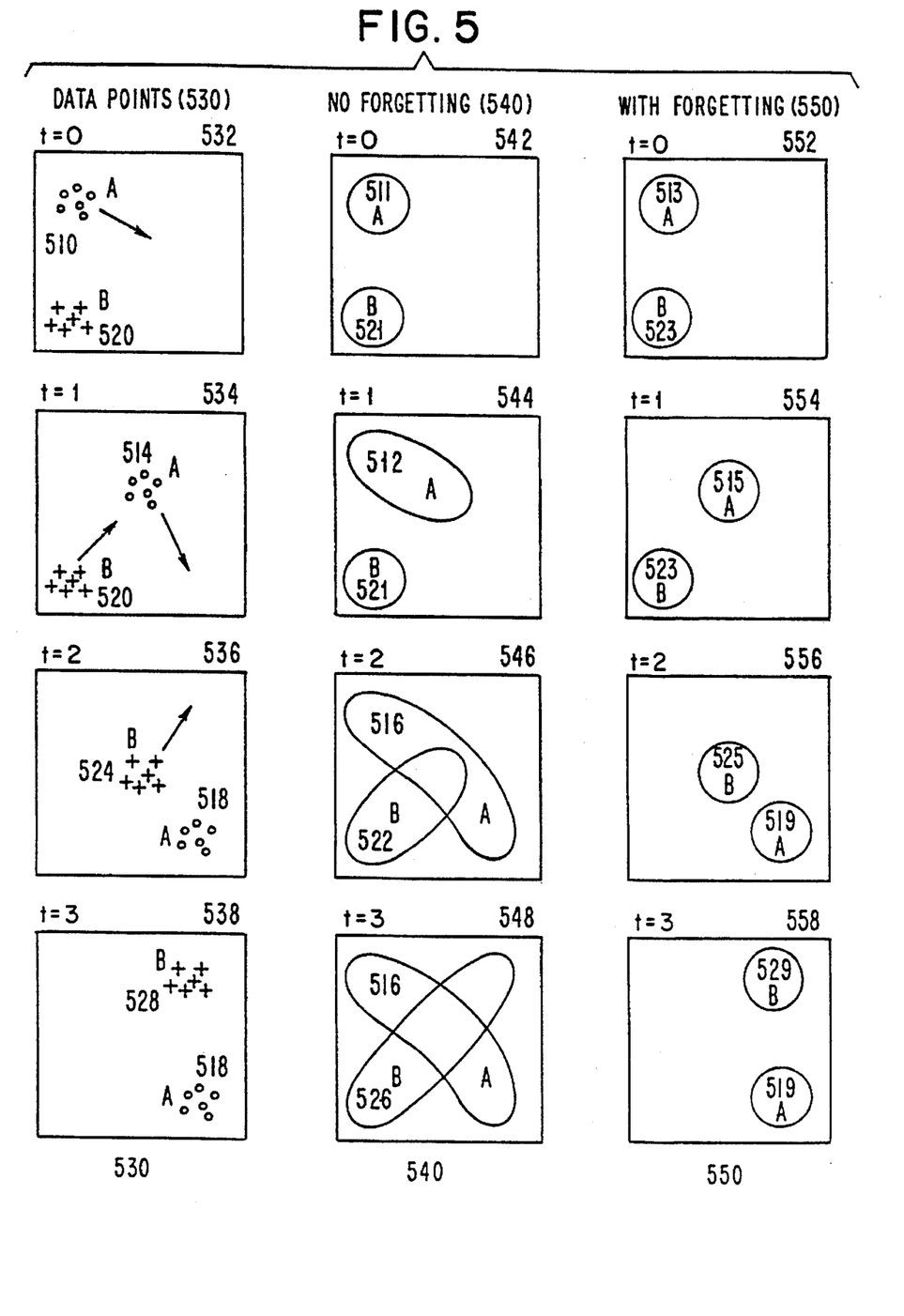
FIG. 5 illustrates how class boundaries are extended both with and without forgetting and the problem that arises when class tracks overlap.

As FIG. 5 illustrates, it can be advantageous to forget some older prototype descriptions even if space permits retaining all of them. Here there are two classes of objects, A (circles, 510) and B (crosses, 520). Each prototype description of an object class has two features: its x and y coordinates. The job of a classifier is to divide the object description space (all possible x and y pairs) into regions belonging to class A or B. In this figure the left hand column (530) shows object descriptions of each object class received at different times (t=0 to t=3; 532, 534, 536, 538). Notice that the average characteristics of both object descriptions A and object descriptions B change as time progresses (i.e., there is a shift in the average position of the set of points corresponding to the object descriptions of a n object class, such as denoted by 510, 514, 518 and 520, 524, 528).

The center column (540) of FIG. 5 shows object class boundaries (511, 512, 516 and 521, 522, 526) based on the object descriptions received at each time plus all the object descriptions received previously. Here, an object class boundary is the boundary of a classification region. Eventually at t=3 (548) both A and B are represented by elongated regions (516 and 526) in the object description space. The problem with this approach is deciding what object class should be assigned to object descriptions falling in the region where the two object class regions intersect (as they do in panels 546 and 548). The right hand column (550) shows what happens when only the most recent 6 object descriptions from each object class are used to construct the object class boundaries (513, 515, 519 and 523, 525, 529). Here there is no problem with intersecting object class regions at any time (the object class regions are disjoint in panels 552, 554, 556, 558). Although both A and B pass through the same region of object description space, they are never both there at the same time.

To perform this tracking properly, the K parameter in algorithm 400 should be set to approximately the number of prototype descriptions needed to define an object class at each time step. If K is set too low, the object classes can not be adequately defined and recognition rates will be poor if K is set too high, there will be too much memory of past examples and each object class region will grow a "tail" elongated toward the older prototype descriptions. In the domain of produce recognition, a preferred value of K is 10.

In general, when determining a candidate prototype description to discard, the system should account for how recently it was last used as well as how many times it has been used overall. As discussed above, some types of objects have characteristics (and, therefore, object descriptions) that change over time. Thus it makes sense to prefer prototype descriptions which were used more recently (e.g., one of the top matches determined by algorithm 200) and are hence more representative of the current object class characteristics. On the other hand, the more times a prototype description has been matched, the more useful it is. Deleting it will likely have a greater impact on matching performance than deleting a less frequently used prototype description would.

Figure 6:
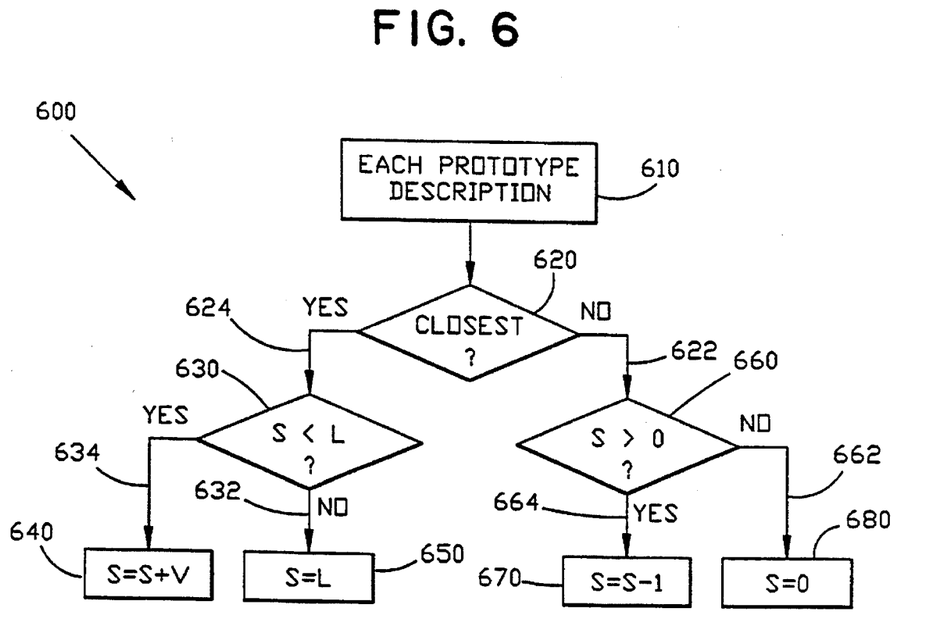
FIG. 6 is a flow chart showing a preferred embodiment of the present method for generating usefulness scores for the prototype descriptions in each class.

FIG. 6 shows a flowchart for algorithm 600 which computes and updates "usefulness scores" for prototype descriptions. These usefulness scores are the metric used by step 440 in algorithm 400 to find a class's least useful prototype description (i.e., with lowest usefulness score). Before running algorithm 600 it is assumed that the object class (classification 164) of an object description has been determined by algorithm 200, possibly verified or corrected by input (correction 168) from user I/O device 160, and that any new prototype descriptions have been added by algorithm 400. After this, algorithm 600 is applied to all prototype descriptions (up to K) associated with the (corrected) object class. The novel idea is to reward the prototype description closest to the object description (135) while punishing all the other prototype descriptions for that object class. The accumulated bonuses and penalties form usefulness score S for each prototype description.

To properly maintain usefulness score S, step 620 first tests each prototype (610) of the object class to determine whether it was the closest match (i.e., the prototype description used for classification by marcher 140). This occurs 624 when the prototype description was the best one (the one with the highest matched score) found by algorithm 200, or when it is the new one added by algorithm 400. In either case, step 630 checks to see if the prototype description's usefulness score (S) is below the maximum allowable value L. If so 634, step 640 increments the usefulness score by amount V. if, instead, the usefulness score is already at or above the limit, branch 632 is taken and step 650 resets the usefulness score to L. If the input prototype description was not the closest match 622, step 660 checks to see if the usefulness score is still positive. If so 664, step 670 decrements the score by one. If, instead, the score was already less than or equal to zero 662, step 680 resets the score to exactly zero. Prototype descriptions with scores of zero are still retained and used by the system. However, they are the first to be replaced if a new example is added.

Figure 7:
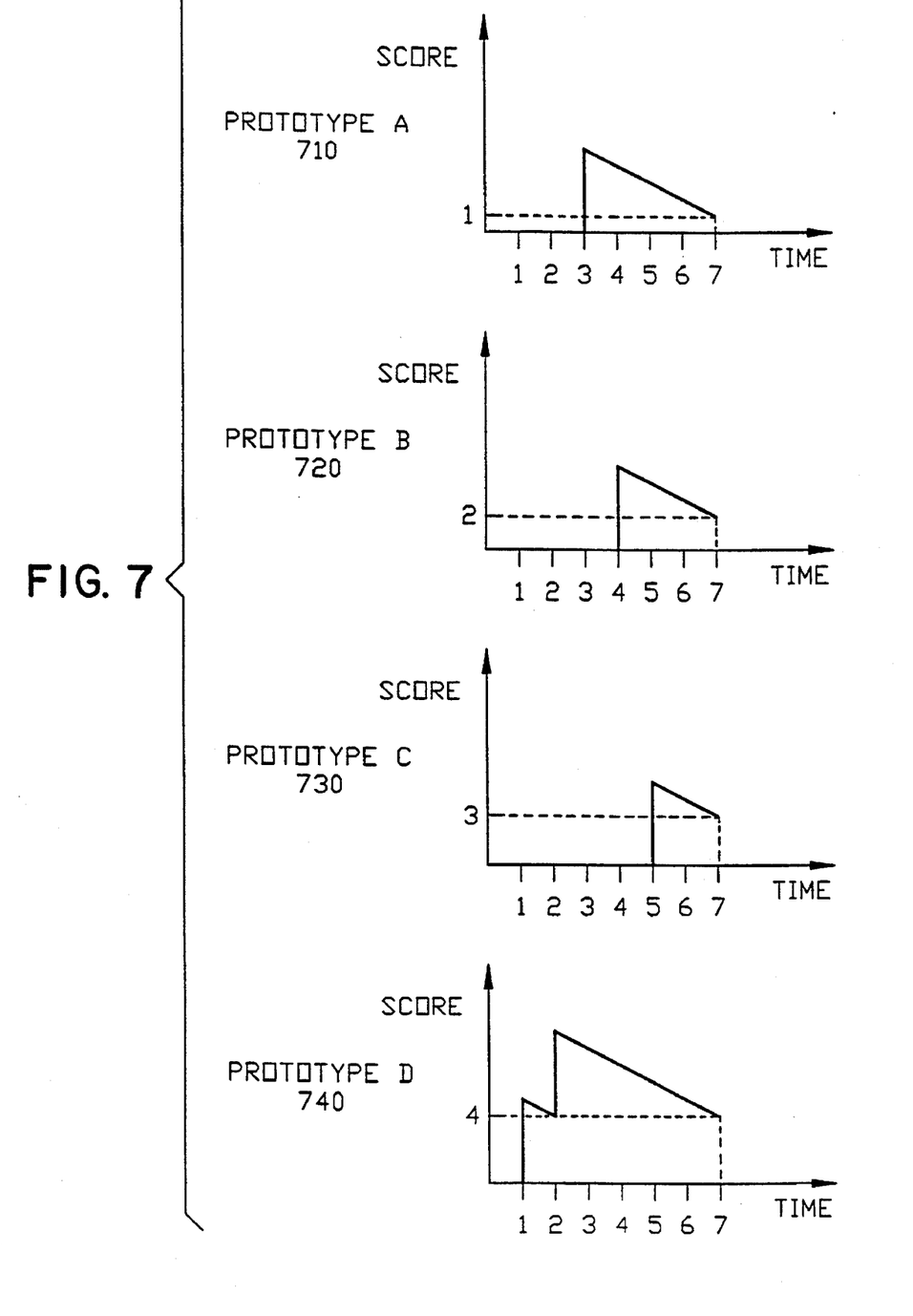
FIG. 7 illustrates how the usefulness scores associated with prototype descriptions encode both the frequency and recency of usage.

FIG. 7 shows how the resulting usefulness scores (S) depend on both recency and frequency of use. As depicted in the top graph 710, prototype description A is first used at time 3. Its score is therefore boosted up by V (5 in this case) but then decays by 1 every time step afterward. Similarly, B (graph 720) is used at time 4 and C (graph 730) is used at time 5. Suppose at time 7 the system has already accumulated K prototype descriptions for this object class and that some old prototype description needs to be replaced. At this time prototype description A has score 1, B has score 2, and C has score 3. Therefore, prototype description A, the one least recently used, will be deleted to make room for the new prototype description. Yet, as the graph for prototype description D (740) shows, it is not always the least recently used prototype description that gets replaced. Here, D is used at time 1 and time 2 but never afterwards. Hence at time 7 D is the least recently used prototype description. However, at time 7 D has a score of 4 which is greater than the score for prototype description A (and B and C, too). Thus, because it was fairly useful in the past, D is preferentially retained even though it has not been used in a while.

To make algorithm 600 work well in practice, appropriate values must be chosen for the V and L parameters. A suitable choice of value for V (the reward increment) can be estimated based on the number of prototype descriptions, K, allowed per class. If all prototype descriptions where used equally often the probability of using any particular one would be 1/K. Allowing for some variation in usage (some of the prototype descriptions might be necessary to cover real but infrequent examples) a prototype description can be considered to be doing its share of the recognition work if it is matched at least 1/(2*K) of the time. Thus, over 2*K presentations the score will typically be incremented by V once and decremented 2*K−1 times. To keep such a prototype description's usefulness score stable, V should be approximately equal to 2*K. For the produce recognition application where K=10, a preferred value for V is 20. In applications where the minimal set of prototype descriptions necessary to define a class has a very uneven distribution of usage, it may be desirable to set V differently for each class. Here, the proper value of V should be based on the relative probability of using the least popular (but still necessary) prototype description.

A suitable value for L (the score ceiling) in algorithm 600 depends on a number of factors. First of all, it is necessary to know how quickly the characteristics (object descriptions) of a object class change. Next, assume a prototype description has been used heavily in the past and has a usefulness score of L. If it is not used within the time interval typically associated with the class drift, its score should decay to zero. Since the score for this prototype description only decays when its class is matched, the second thing that needs to be known is the frequency of matching/recognition (the frequency at which a produce item in a certain class is bought).

The second question is addressed first. Consider a produce recognition use of system 100 in a supermarket. When recognizing produce at the checkout in a supermarket, it can be assumed there are 100 items per order of which 10% are produce. Typical checkout time for such an order is about 3 minutes including tendering. Thus a recognition is performed about every 18 seconds during heavy sales times. Assuming that heavy sales occur only 12 hours a day, this yields about 2400 recognitions a day. A typical store might have 120 types of produce in it. Thus, for an even distribution of sales, each class of produce is recognized 20 times a day on average per register. However, some types (such as bananas) are more popular than others (like rutabagas) so a more realistic value is about 10 recognitions a day per produce class (per register).

Now we return to the first question and try to establish an estimate of how often class characteristics change. Stores receive a new shipment of produce every 2 to 4 days. Assuming that class drift happens not because of shelf aging but because of re-supply, the typical drift period would be on the order of a week. In a week each class is recognized about 70 times at each register or about 350 times total if there are 5 registers. Thus, the value of L should be set so that this many trials and non-matches causes the maximal usefulness score to decay to zero. Using these values a preferred value for L is 400 in this application. Coupled with a preferred value of V, this also means a prototype can obtain maximum score L in a single day of heavy use (assuming it is the best matched prototype for its class 50% of the time). Again, if the sales percentage for different items varies considerably, it may be desirable to set a different L for each class using the guidelines given above.

Given this disclosure, one skilled in the art could develop equivalent embodiments of this invention that are also within the contemplation of the inventors.

We claim:

1. An adaptive classifier apparatus comprising:

means for scanning a test object and outputting a parameter signal representing a scanned physical parameter of the test object;

means for receiving said parameter signal and for generating a test feature data based on said parameter signal;

means for retrievably storing a first plurality of a prototype feature data and a second plurality of a prototype feature data;

classifying means for comparing said test feature data to each of said first plurality and to each of said second plurality of prototype feature data and for generating a classifier data indicating which of said first plurality and said second plurality has a prototype feature data comparing closest to said test feature data;

means for generating an event signal associated with said generating a classifier data;

means for generating a usefulness data corresponding to each of said first plurality and said second plurality of prototype feature data, said usefulness data representing a frequency and recency relative to said event signal that its associated prototype feature datum is the prototype feature datum comparing closest with the test feature;

means for modifying said stored first plurality of prototype feature data and said stored second plurality of prototype feature data based on said usefulness data.

2. An adaptive classifier apparatus according to claim 1 wherein said means for generating a usefulness data increases said usefulness data by a first amount at each event count at which the prototype feature datum associated with said usefulness data compares closest to the test feature data and decreases said usefulness data by a second amount at each event count at which the prototype feature datum associated with said usefulness data does not compare closest to the test feature data.

3. An adaptive classifier apparatus according to claim 1 further comprising:

means for storing a data associated with said test feature data as one of said first plurality of prototype feature data in response to said classifier data indicating said test feature data as comparing closest with a prototype feature data of said first plurality; and means for storing a data associated with said test feature data as one of said second plurality of prototype feature data in response to said classifier data indicating said test feature data as comparing closest with a prototype feature data of said second plurality.

4. An adaptive classifier apparatus according to claim 3 wherein said means for storing a first plurality of prototype data and second plurality of prototype data stores a maximum population data for said first plurality and a maximum population data for said second plurality, said maximum populations being less than a maximum physical storage capacity of said means and wherein said means for modifying said first and second plurality of prototype feature data deletes a prototype feature data in accordance with said maximum population data and in an order of deletion based on said usefulness data.

5. An adaptive classifier apparatus according to claim 1 wherein means for receiving said scanned parameter signal generates a test feature data representing a visual characteristic of said test object, and wherein said first plurality of prototype feature data and said second plurality of prototype feature data represent prototype visual characteristics.

6. An adaptive classifier apparatus according to claim 5 wherein said visual characteristic of the test object is a color characteristic and wherein said prototype visual characteristics are color characteristics.

7. An adaptive classifier apparatus according to claim wherein said visual characteristic of the test object is a texture characteristic and wherein said prototype visual characteristics are texture characteristics.

8. An adaptive classifier apparatus according to claim 5 wherein said visual characteristic of the test object is a size characteristic and wherein said prototype visual characteristics are size characteristics.

9. An adaptive classifier apparatus according to claim 1 wherein said means for storing a first plurality of prototype data and second plurality of prototype data establishes a maximum population for said first plurality and a maximum population for said second plurality, said maximum populations being less than a maximum physical storage capacity of said means and wherein said means for deleting a classifier feature data deletes said classifier data in accordance with said maximums and in an order of deletion based on said usefulness data.

10. An adaptive classifier apparatus according to claim 1 wherein said classifier means includes means for generating a proximity value representing a similarity between said test feature data and each of said first plurality of prototype feature data and said second plurality of prototype feature data.

11. An adaptive classifier apparatus according to claim 10 wherein said classifier means further includes:
    means for storing a predetermined threshold; and
    means for generating a strength data, based on said proximity value and said predetermined threshold, corresponding to said generated classifier data.

12. An adaptive classifier apparatus according to claim 10 further comprising:
    means for storing a third plurality of prototype feature data and wherein said classifier means comprises
    means for detecting a prototype feature data from said first plurality of prototype feature data comparing closest to said test feature data,
    means for detecting a prototype feature data from said second plurality of prototype feature data comparing closest to said test feature data, and
    means for detecting a prototype feature data from said third plurality of prototype feature data comparing closest to said test feature data; and
    means for generating a class option data representing a relative order of a magnitude of the proximity value corresponding to said closest prototype feature point from said first, second and third plurality of prototype feature data.

13. An adaptive classifier apparatus according to claim 12 further comprising means for displaying said class option data.

14. An adaptive classifier apparatus according to claim 13 wherein said classifier means includes means for storing a predetermined threshold, and further comprising
    means for suppressing a display of a class option data based on said proximity values and said threshold.

15. An adaptive classifier apparatus according to claim 10 wherein said classifier means comprises:
    means for detecting a difference between said test feature data and each of said first plurality and each of said second plurality of prototype feature data and for generating said proximity data based on said detected difference;
    means for detecting an Nth nearest neighbor classifier feature datum from among said first and second plurality of prototype feature data, based on said proximity data, and
    wherein said classifier data reflects which of said first plurality and said second plurality that said Nth nearest neighbor feature datum point is associated with.

* * * * *